United States Patent
Weber et al.

(10) Patent No.: US 6,232,397 B1
(45) Date of Patent: May 15, 2001

(54) MOLDING COMPOUNDS CONSISTING OF A POLYCARBONATE MIXTURE AND A SILOXANE RETICULAR RUBBER

(75) Inventors: Martin Weber, Maikammer; Norbert Güntherberg, Speyer, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/242,733
(22) PCT Filed: Aug. 21, 1997
(86) PCT No.: PCT/EP97/04543
 § 371 Date: Feb. 22, 1999
 § 102(e) Date: Feb. 22, 1999
(87) PCT Pub. No.: WO98/08900
 PCT Pub. Date: Mar. 5, 1998

(30) Foreign Application Priority Data

Aug. 30, 1996 (DE) ............................................... 196 35 078

(51) Int. Cl.[7] .................................................. C08G 64/00
(52) U.S. Cl. ........................... 525/67; 525/101; 525/100; 525/464; 524/140; 524/141; 524/143; 524/145; 524/127
(58) Field of Search .......................... 525/67, 101, 464, 525/100; 524/141, 140, 145, 127, 143

(56) References Cited

U.S. PATENT DOCUMENTS

| 2,891,920 | 6/1959 | Hyde et al. | 260/29.2 |
|---|---|---|---|
| 3,294,725 | 12/1966 | Findlay et al. | 260/29.2 |
| 4,269,964 | 5/1981 | Feitag et al. | 528/126 |
| 4,584,360 | 4/1986 | Paul et al. | 528/14 |
| 4,732,949 | 3/1988 | Paul et al. | 525/464 |
| 4,806,593 | 2/1989 | Kress et al. | 525/63 |
| 5,362,783 | * 11/1994 | Eiffler et al. | 524/154 |

FOREIGN PATENT DOCUMENTS

| 42 38 906 | 5/1993 | (DE) . |
|---|---|---|
| 111 260 | 6/1984 | (EP) . |
| 307 963 | 3/1989 | (EP) . |
| 369 200 | 5/1990 | (EP) . |
| 641 827 | 3/1995 | (EP) . |
| 663 425 | * 7/1995 | (EP) . |
| 93/22382 | 11/1993 | (WO) . |

OTHER PUBLICATIONS

Kolloid–Z.u.Z. Polymere 250, 782–796, (1972).
Herstellung von Styrol und Polystyrol, Lit. S. 135. 124–130.

* cited by examiner

Primary Examiner—Margaret G. Moore
(74) Attorney, Agent, or Firm—Keil & Weinkauf

(57) ABSTRACT

Molding materials contain, as essential components, an aromatic polycarbonate, a graft polymer based on alkyl acrylates, styrenes and unsaturated nitriles, a copolymer based on styrenes and unsaturated nitrites, a siloxane network rubber, a copolymer of at least two different esters of acrylic acid or of methacrylic acid or mixtures thereof, if desired halogen-free phosphorus compounds and additives, and moldings, films or fibers are obtainable from the molding materials.

14 Claims, No Drawings

MOLDING COMPOUNDS CONSISTING OF A POLYCARBONATE MIXTURE AND A SILOXANE RETICULAR RUBBER

The present invention relates to molding materials which contain, as essential components, A) from 25 to 95.4% by weight of at least one aromatic polycarbonate,
B) from 2 to 30% by weight of at least one graft polymer composed of
   $b_1$) from 40 to 80% by weight of a grafting base comprising an elastomeric polymer based on alkyl acrylates where the alkyl radical is of from 1 to 8 carbon atoms and having a glass transition temperature of less than 10° C.
   $b_2$) from 20 to 60% by weight of a graft layer comprising
   $b_{21}$) from 60 to 95% by weight of styrene or substituted styrenes of the general formula I

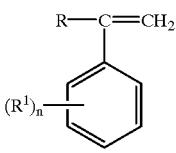

where R is alkyl of 1 to 8 carbon atoms or hydrogen, $R^1$ is alkyl of 1 to 8 carbon atoms and n is 1, 2 or 3, and
   $b_{22}$) from 5 to 40% by weight of at least one unsaturated nitrile,
C) from 2 to 50% by weight of a copolymer of
   $c_1$) from 60 to 95% by weight of styrene or substituted styrenes of the general formula I or mixtures thereof
   $c_2$) from 5 to 40% by weight of at least one unsaturated nitrile,
D) from 0.5 to 25% by weight of at least one network rubber based on siloxanes and acrylates or methacrylates, whose graft layer has a glass transition temperature of at least 100° C.,
E) from 0.1 to 5% by weight of at least one copolymer of at least two different esters of acrylic acid or of methacrylic acid or mixtures thereof,
F) from 0 to 25% by weight of at least one halogen-free phosphorus compound and
G) from 0 to 45% by weight of additives,
the sum of components A to G being 100% by weight.

The present invention furthermore relates to the use of these molding materials for the production of moldings, films and fibers, and to the moldings, films and fibers obtainable from the novel molding materials.

Siloxane rubbers are frequently used in polymer blends which contain polycarbonates, in order to improve their toughness. Various siloxane rubbers are used for this purpose. For example, multishell partially crosslinked graft rubbers having an acrylate core and a siloxane shell are used in DE-A 42 38 906. Crosslinked siloxanes may also serve as a grafting base for siloxane graft rubbers (cf. for example EP-A 260 559). Another group of siloxane rubbers comprises the network rubbers, which are also referred to as compound rubbers. The latter differ from graft rubbers in that the siloxane rubber component and at least one further rubber component interpenetrate one another in network form, the rubbers being linked to one another via chemical bonds. These networks may also be provided with one or more graft shells.

EP-A 369 200 disclosed, for example, blends of polycarbonate, styrene/acrylonitrile copolymers and siloxane-based network rubbers. Therein, the network rubber imparts a dull surface to moldings comprising the molding materials. Japanese Preliminary Application 6049313 disclosed molding materials which comprise polycarbonate and siloxane network rubber and have high impact strength.

Polycarbonate/polyester blends containing siloxane network rubber are disclosed in EP-A 307 963. These molding materials contain styrene/acrylonitrile copolymers as a further component and are distinguished by their good low-temperature toughness.

EP-A 641 827 describes readily flowing blends of polycarbonate, acrylonitrile/butadiene/styrene (ABS) and a siloxane-based network rubber. These molding materials may contain small amounts of other polymers, such as vinyl polymers, which are formed as byproducts in the grafting of the siloxane network rubbers.

The known polycarbonate blends which contain siloxane-based network rubbers have the disadvantage that the shaped articles produced therefrom have different total penetration energies, depending on the temperature at which they are molded. This means that the total penetration energy is dependent on the processing conditions, ie. on the respective melt temperature, which has a particularly adverse effect when large shaped articles are to be produced. In the mold, the molding material does not of course always cool uniformly, ie. different values of the total penetration energy are measured at different points of the shaped article.

It is an object of the present invention to provide molding materials which comprise polycarbonate and siloxane network rubbers, and retain the advantages of the known blends, ie. low-temperature toughness and good flow, but can be processed independently of the process conditions.

We have found that this object is achieved by the molding materials defined at the outset. Particular embodiments are described in the subclaims and in the description.

Component A

According to the invention, the molding materials contain, as component A, from 25 to 95.4% by weight, based on the sum of the components A to G, of at least one polycarbonate. Preferred novel molding materials contain from 25 to 88.8% by weight, based on the sum of the components A to G, of component A. Molding materials according to the invention which contain from 27.5 to 86.2% by weight, based on the sum of the components A to G, of component A are particularly preferred.

Preferably used components A are halogen-free polycarbonates. Suitable halogen-free polycarbonates are, for example, those based on diphenols of the general formula II

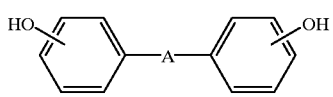

where A is a single bond, a $C_1$–$C_3$-alkylene, a $C_2$–$C_3$-alkylidene, or a $C_3$–$C_6$-cycloalkylidene group, —S— or —$SO_2$—.

Preferred diphenols of the formula II are, for example, hydroquinone, resorcinol, 4,4'-dihydroxybiphenyl, 2,2-bis-(4-hydroxyphenyl)-propane, 2,4-bis-(4-hydroxyphenyl)-2-methylbutane and 1,1-bis-(4-hydroxyphenyl)cyclohexane. 2,2-Bis-(4-hydroxyphenyl)propane and 1,1-bis-(4-hydroxyphenyl)cyclohexane are particularly preferred, as well as 1,1-bis-(4-hydroxyphenyl)-3,3,5-trimethylcyclohexane.

Both homopolycarbonates and copolycarbonates are suitable as component A, the copolycarbonates of bisphenol A being preferred in addition to the bisphenol A homopolymer.

The suitable polycarbonates may be branched in a known manner, preferably by incorporation of from 0.05 to 2.0 mol %, based on the sum of the diphenols used, of at least trifunctional compounds, for example those having three or more than three phenolic OH groups.

Polycarbonates which have proven particularly suitable are those which have relative viscosities $\eta_{rel}$ of from 1.10 to 1.50, in particular from 1.25 to 1.40. This corresponds to weight average molecular weights $M_w$ of from 10,000 to 200,000, preferably from 20,000 to 80,000.

The diphenols of the general formula II are known per se or can be prepared by known processes.

The polycarbonates can be prepared, for example, by reacting the diphenols with phosgene by the phase boundary method or with phosgene by the method in the homogeneous phase (ie. the pyridine method), the molecular weight to be established in each case being obtained in a known manner by means of an appropriate amount of known chain terminators. (Regarding polydiorganosiloxane-containing polycarbonates, cf. for example German Laid-Open Application DOS 3,334,782.)

Suitable chain terminators are, for example, phenol and p-tert-butylphenol as well as long-chain alkylphenols, such as 4-(1,3-tetramethylbutyl)phenol, according to German Laid-Open Application DOS 28 42 005, or monoalkylphenols or dialkylphenols having a total of 8 to 20 carbon atoms in the alkyl substituents, according to DE-A 35 06 472, such as p-nonylphenol, 3,5-di-tert-butylphenol, p-tert-octylphenol, p-dodecylphenol, 2-(3,5-dimethylheptyl) phenol and 4-(3,5-dimethylheptyl)phenol.

For the purposes of the present invention, halogen-free polycarbonates mean that the polycarbonates are composed of halogen-free diphenols, halogen-free chain terminators and, if required, halogen-free branching agents, the content of minor ppm amounts of hydrolyzable chlorine, resulting, for example, from the preparation of the polycarbonates with phosgene by the phase boundary method, not being regarded as halogen-containing for the purposes of the present invention. Such polycarbonates containing ppm amounts of hydrolyzable chlorine are halogen-free polycarbonates for the purposes of the present invention.

Component B

A graft copolymer or a mixture of different graft copolymers is used as component B in the novel molding materials in amounts of from 2 to 30% by weight, based on the sum of the components A to G. Preferred novel molding materials contain from 2 to 25, particularly preferably from 6 to 22.5, % by weight, based on the sum of the components A to G, of at least one graft copolymer B.

The graft polymers B are composed of $b_1$) from 40 to 80, preferably from 50 to 70, % by weight of a grafting base comprising an elastomeric polymer based on alkyl acrylates where the alkyl radical is of 1 to 8 carbon atoms and having a glass transition temperature of less than 0° C. and $b_2$) from 20 to 60, preferably from 30 to 50, % by weight of a graft layer comprising $b_{21}$) from 60 to 95, preferably from 70 to 85, % by weight of styrene or substituted styrenes of the general formula I

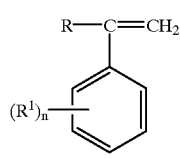

where R is $C_1$–$C_8$-alkyl, preferably methyl or ethyl, or hydrogen, $R^1$ is $C_1$–$C_8$-alkyl, preferably methyl or ethyl, and n is 1, 2 or 3, or mixtures thereof and $b_{22}$) from 5 to 40, preferably from 15 to 30, % by weight of at least one unsaturated nitrile, preferably acrylonitrile or methacrylonitrile, or mixtures thereof.

Suitable polymers for the grafting base $b_1$ are those whose glass transition temperature is below 10° C., preferably below 0° C., particularly preferably below −20° C. These are, for example, elastomers based on $C_1$–$C_8$-alkyl esters of acrylic acid, which may contain further comonomers.

Preferred grafting bases $b_1$ are those which are composed of $b_{11}$) from 70 to 99.9, preferably 99, % by weight of at least one alkyl acrylate where the alkyl radical is of 1 to 8 carbon atoms, preferably n-butyl acrylate and/or 2-ethylhexyl acrylate, in particular n-butyl acrylate as sole alkyl acrylate $b_{12}$) from 0 to 30, in particular from 20 to 30, % by weight of a further copolymerizable monoethylenically unsaturated monomer, such as butadiene, isoprene, styrene, acrylonitrile, methyl methacrylate or vinyl methyl ether or mixtures thereof $b_{13}$) from 0.1 to 5, preferably from 1 to 4, % by weight of a copolymerizable, polyfunctional, preferably bi- or trifunctional monomer which effects crosslinking.

Suitable bi- or polyfunctional crosslinking monomers $b_{13}$) of this type are monomers which preferably contain two, if necessary also three or more, ethylenic double bonds which are capable of copolymerization and are not conjugated in the 1,3 positions. Examples of suitable crosslinking monomers are divinylbenzene, diallyl maleate, diallyl fumarate, diallyl phthalate, triallyl cyanurate and triallyl isocyanurate. The acrylate of tricyclodecenyl alcohol has proved to be a particularly advantageous crosslinking monomer (cf. DE-A 12 60 135).

This type of grafting base is known per se and is described in 40 the literature, for example in DE-A 31 49 358.

Preferred graft layers $b_2$ are those in which $b_{21}$ is styrene or α-methylstyrene or mixtures thereof and $b_{22}$ is acrylonitrile or methacrylonitrile. Particularly preferably used monomer mixtures are styrene and acrylonitrile or α-methylstyrene and acrylonitrile. The graft layers are obtainable by copolymerizing the components $b_{21}$ and $b_{22}$.

The grafting base $b_1$ of the graft polymers B, which is composed of the components $b_{11}$, if required $b_{12}$ and $b_{13}$, is also referred to as an ASA rubber. Its preparation is known per se and is described, for example, in DE-A 28 26 925, DE-A 31 49 358 and DE-A 34 14 118.

The graft polymers B can be prepared, for example, by the method described in German Patent 1,260,135.

The graft layer (graft shell) of the graft polymers can be synthesized in one stage or two stages.

In the case of the one-stage synthesis of the graft shell, a mixture of the monomers $b_{21}$ and $b_{22}$ in the desired weight ratio of from 95:5 to 50:50, preferably from 90:10 to 65:35, is polymerized in the presence of the elastomer $b_1$, in a manner known per se (cf. for example German Laid-Open Application DOS 2,826,925), preferably in emulsion.

In the case of a two-stage synthesis of the graft shell $b_2$, the first stage generally accounts for from 20 to 70, preferably from 25 to 50, % by weight, based on $b_2$. Preferably only styrene or substituted styrenes or mixtures thereof ($b_{21}$) are used for its preparation.

The 2nd stage of the graft shell generally accounts for from 30 to 80, in particular from 50 to 75, % by weight, based in each case on $b_2$. Mixtures of the monomers $b_{21}$ and the nitriles $b_{22}$ in a weight ratio $b_{21}/b_{22}$ of in general from 90:10 to 60:40, in particular from 80:20 to 70:30, are used for its preparation.

The conditions of the graft polymerization are preferably chosen so that particle sizes of from 50 to 700 nm ($d_{50}$ value of the integral mass distribution) result. The relevant measures are known and are described, for example, in German Laid-Open Application DOS 2,826,925.

A coarse-particled rubber dispersion can be prepared directly by the seed latex method.

In order to obtain very tough products, it is frequently advantageous to use a mixture of at least two graft polymers having different particle sizes.

In order to achieve this, the size of the rubber particles is increased in a known manner, for example by agglomeration, so that the latex has a bimodal (from 50 to 180 nm and from 200 to 700 nm) composition.

In a preferred embodiment, a mixture of two graft polymers having particle diameters ($d_{50}$ value of the integral mass distribution) of from 50 to 180 nm and from 200 to 700 nm in a weight ratio of from 70:30 to 30:70 is used.

The chemical composition of the two graft polymers is preferably the same although the shell of the coarse-particled graft polymer may in particular be synthesized in two stages.

Mixtures of the components A and B, the latter having a coarse-particled and a fine-particled graft polymer, are described, for example, in German Laid-Open Application DOS 3,615,607. Mixtures of the components A and B, the latter having a two-stage graft shell, are disclosed in EP-A 111 260.

Component C

The novel molding materials contain, as component C, from 2 to 50% by weight, based on the sum of the components A to G, of at least one copolymer based on styrene or substituted styrenes and unsaturated nitriles. Preferred novel molding materials contain the component C in amounts of from 5 to 40, in particular from 6 to 35, % by weight, based on the sum of the components A to G.

According to the invention, the copolymers C are composed of $c_1$) from 60 to 95, preferably from 70 to 85, % by weight of styrene or substituted styrenes of the general formula I or mixtures thereof and $c_2$) from 5 to 40, preferably from 15 to 30, % by weight of at least one unsaturated nitrile, preferably acrylonitrile or methacrylonitrile or mixtures thereof.

The copolymers C are resin-like, thermoplastic and rubber-free. Particularly preferred copolymers C are those of styrene and acrylonitrile, of α-methylstyrene and acrylonitrile or of styrene, α-methylstyrene and acrylonitrile. It is also possible to use a plurality of the copolymers described simultaneously.

Such copolymers are frequently formed as byproducts in the graft polymerization for the preparation of the component B, particularly when large amounts of monomers are grafted onto small amounts of rubber.

The copolymers C are known per se and can be prepared by free radical polymerization, and in particular by emulsion, suspension, solution and mass polymerization. They have viscosity numbers of from 40 to 160, corresponding to weight average molecular weights $M_w$ of from 40,000 to 2,000,000.

Component D

The novel molding materials contain, as a further component, from 0.5 to 25% by weight, based on the sum of the components A to G, of at least one network rubber D. Preferred novel molding materials contain the network rubbers D in amounts of from 1 to 20% by weight, based on the sum of the components A to G. For the purposes of the present invention, particularly preferred molding materials contain from 1.5 to 17.5% by weight, based on the sum of the components A to G, of network rubbers D.

According to the invention, D is a network rubber based on siloxanes and acrylates or methacrylates.

The network rubbers D contain in general $d_1$) from 30 to 95, preferably from 40 to 90, % by weight of a network as a grafting base, which network is composed of $d_{11}$) from 10 to 90, preferably from 20 to 80, % by weight of at least one polyorganosiloxane and $d_{12}$) from 10 to 90, preferably from 20 to 80, % by weight of a polyalkyl acrylate or of a polyalkyl methacrylate or of mixtures thereof and $d_2$) from 5 to 70, preferably from 10 to 60, % by weight of a graft layer.

Preferred polysiloxanes are derived from cyclic organosiloxanes having, preferably, from three to six silicon atoms. Examples of suitable siloxanes are hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenyl-cyclotetrasiloxane and octaphenylcyclotetrasiloxane. The polysiloxanes may be composed of one organosiloxane or of different organosiloxanes.

Furthermore, the polyorganosiloxanes $d_{11}$ contain, as a rule, from 0.1 to 30% by weight, based on $d_{11}$, of at least one crosslinking agent. Tri- or tetrafunctional silanes, such as trimethoxymethylsilane, triethoxyphenylsilane, tetramethoxysilane, tetraethoxysilane, tetra-n-propoxysilane or tetrabutoxysilane, may be used as crosslinking agents. Among these, tetrafunctional silanes are particularly preferred.

The polyorganosiloxanes furthermore contain in general from 0 to 10% by weight, based on $d_{11}$, of graft-linking monomers. For example, unsaturated silanes of the general formulae III to V

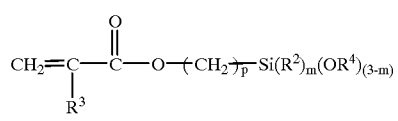

III

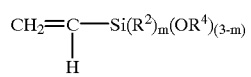

IV

where $R^2$ is methyl, ethyl, n-propyl, isopropyl or phenyl, $R^3$ is hydrogen or methyl, $R^4$ is $C_1$–$C_{10}$-alkyl or $C_6$–$C_{18}$-aryl, preferably methyl, ethyl, n-propyl, isopropyl, n-butyl, isobutyl, tert-butyl or phenyl, m is 0, 1 or 2 and p is an integer from 1 to 6, may be used as graft-linking monomers.

Preferred graft-linking monomers are the methacryloyl-silanes of the general formula III. Examples are
β-methacryloyloxyethyldimethoxymethylsilane
γ-methacryloyloxypropylmethoxydimethylsilane
γ-methacryloyloxypropyldimethoxymethylsilane
γ-methacryloyloxypropyltrimethoxysilane
γ-methacryloyloxypropylethoxydiethylsilane
γ-methacryloyloxypropyldiethoxymethylsilane
δ-methacryloyloxybutyldiethoxymethylsilane.

Processes for the preparation of polyorganosiloxanes are described, for example, in U.S. Pat. Nos. 2,891,920 or 3,294,725. The polyorganosiloxanes are preferably prepared by mixing a mixture of the organosiloxanes, the crosslinking agents and, if desired, the graft-linking monomers with water in a solvent with shearing in the presence of an emulsifier, such as an alkanesulfonic acid or, preferably, an alkylbenzenesulfonic acid. The metal salts of the alkane-sulfonic acid or of the alkylbenzenesulfonic acid may also be used as emulsifiers.

The polyalkyl acrylates or polyalkyl methacrylates $d_{12}$ generally contain, as monomeric building blocks, alkyl acrylates or methacrylates or mixtures thereof, crosslinking agents and graft-linking monomers, it being possible to use crosslinking agents and graft-linking monomers in each case alone or together. The amount of crosslinking agents and graft-linking monomers together is as a rule from 0.1 to 20% by weight, based on $d_{12}$.

Examples of suitable alkyl acrylates or alkyl methacrylates are methyl acrylate, ethyl acrylate, n-propyl acrylate, n-butyl acrylate, 2-ethylhexyl acrylate, hexyl methacrylate, 2-ethylhexyl methacrylate and n-lauryl methacrylate. n-Butyl acrylate is particularly preferably used.

The crosslinking agent may be, for example, ethylene glycol dimethacrylate, propylene glycol dimethacrylate, 1,3-butylene glycol dimethacrylate or 1,4-butylene glycol dimethacrylate.

Allyl methacrylate, triallyl cyanurate or triallyl isocyanurate are examples of suitable graft-linking monomers. Among these, allyl methacrylate may also act as a crosslinking agent.

The network is prepared by adding the monomeric building blocks of component $d_{12}$ to the polyorganosiloxane $d_{11}$, which has been neutralized by adding an aqueous solution of a base, such as sodium hydroxide, potassium hydroxide or calcium hydroxide. This causes the polyorganosiloxane to swell. Conventional free radical initiators are then added. A network in which the components $d_{11}$ and $d_{12}$ interpenetrate one another is formed in the course of the polymerization reaction. The networks may also be linked to one another via chemical bonds.

Networks in which the polyorganosiloxane has a main chain of dimethylsiloxane and $d_{12}$ is a polyalkyl acrylate which has a main chain of n-butyl acrylate are very particularly preferred.

The gel content of the network is as a rule more than 80% (measured by extraction with toluene at 90° C. over a period of 12 hours).

The graft layer $d_2$ is as a rule composed of vinylic monomers. These include styrene, α-methylstyrene, vinyltoluene, acrylates, eg. methyl acrylate, ethyl acrylate or n-butyl acrylate, methacrylates, such as methyl methacrylate or ethyl methacrylate, and nitriles, for example acrylonitrile or methacrylonitrile. The vinylic monomers may be used alone. However, it is also possible to use mixtures of different monomers. The monomers are generally chosen so that the graft layer has a glass transition temperature of at least 80° C., preferably from 80 to 110° C. (determined by means of a torsion pendulum measurement at a frequency of 1 Hz and a heating rate of 10° C./min). Graft layers which contain a predominant amount of methyl methacrylate are particularly preferred, especially graft layers containing at least 85% by weight of methyl acrylate. Graft layers containing from 95 to 100% by weight of methyl methacrylate are particularly preferred. In addition to methyl methacrylate, styrene, n-butyl acrylate or cyclohexyl methacrylate is preferably used. Methyl methacrylate alone is very particularly preferably used.

Component E

The novel molding materials contain, as component E, from 0.1 to 5% by weight of at least one copolymer E. Novel molding materials which contain from 0.2 to 4, in particular from 0.3 to 3, % by weight, based on the sum of the components A to G, of component E are preferred.

According to the invention, the copolymers E are composed of at least two different alkyl esters, aromatic or alkylaromatic esters of acrylic acid or of methacrylic acid or mixtures thereof.

In general, the esters have from 1 to 10, preferably from 1 to 8 carbon atoms in the alkyl radical. The alkyl radical may be either linear or branched. The alkyl radicals include methyl, ethyl, n-propyl, isopropyl, n-butyl, isobutyl, tert-butyl, n-pentyl, 2-ethylhexyl and cyclohexyl. Methyl methacrylate, cyclohexyl methacrylate, n-butyl acrylate or 2-ethylhexyl acrylate is preferably used. Among the aromatic esters, esters of 6 to 18 carbon atoms are preferred, in particular phenyl. Copolymers E which contain from 70 to 99, in particular from 80 to 93, % by weight of methyl methacrylate and from 1 to 30, in particular from 7 to 20, % by weight of n-butyl acrylate are particularly preferred.

According to the invention, the polymers E have a high molecular weight. As a rule, they have average molecular weights ($M_w$) of at least 1,000,000 g/mol (measured by means of gel permeation chromatography in tetrahydrofuran against a polystyrene standard). Preferred copolymers E have molecular weights $M_w$ of 1,100,000 g/mol or more, for example at least 1,200,000 g/mol. In general, the copolymers E have a glass transition temperature of from 40 to 125° C., preferably from 70 to 120° C. (determined by means of DSC measurements at a heating rate of 10 K/min, second cycle after heating up to 175° C. and cooling to room temperature).

Component F

The novel molding materials may also be equipped with flameproofing agents. They contain, according to the invention, from 0 to 25, preferably from 0 to 17.5, % by weight, based on the sum of the components A to G, of at least one halogen-free phosphorus compound. For example, they may be present in the molding materials in amounts of from 5 to 15% by weight, based on the sum of the components A to G.

Such phosphorus compounds are known per se or are obtainable by known methods.

Preferred phosphorus compounds are those of the general formula VI in which at least two of the radicals on the phosphorus are identical:

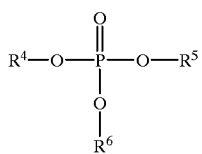

VI where

R⁴, R⁵, R⁶ independently of one another, are each halogen-free $C_1$–$C_8$-alkyl or halogen-free $C_6$–$C_{20}$-aryl, which may be monosubstituted or disubstituted by $C_1$–$C_4$-alkyl.

It is preferable to use aromatic phosphates, in particular phosphates of the general formula VI, in which the radicals are phenyl or cresyl groups which in turn may furthermore be monosubstituted or disubstituted, preferably by methyl, ethyl and isopropyl.

Examples of particularly suitable phosphorus compounds of the general formula VI are tri(2,6-dimethylphenyl) phosphate, triphenyl phosphate, tricresyl phosphate, diphenyl 2-ethylcresyl phosphate, diphenyl cresyl phosphate and tri(isopropylphenyl) phosphate.

In order to obtain a high Vicat temperature of the mixtures, mixtures of the abovementioned phosphates with, for example, triphenylphosphine oxide or tri(2,6-dimethylphenyl) phosphine oxide may also be used.

The addition of the phosphates stated in DE-A 38 24 356, such as bisphenyl 4-phenylphenyl phosphate, phenyl bis(4-phenylphenyl) phosphate, tris(4-phenylphenyl) phosphate, bisphenyl benzylphenyl phosphate, phenyl bis(benzylphenyl) phosphate, tris(benzylphenyl) phosphate, phenyl bis[(1-phenylethyl)phenyl] phosphate, phenyl bis[(1-methyl-1-phenylethyl)phenyl] phosphate and phenyl bis[4-(1-phenylethyl)-2,6-dimethylphenyl] phosphate, is suitable for increasing the Vicat temperature of the mixtures.

Resorcinol diphosphate or corresponding higher oligomers and hydroquinone diphosphate or higher oligomers of this compound may furthermore be used as component F. Such phosphorus compounds are described, for example, in EP-A 522 397.

Component G

In addition to the components A to F, the molding materials contain, according to the invention, from 0 to 45, preferably from 0 to 35, % by weight, based on the sum of the components A to G, of additives.

Additives are to be understood as meaning, for example, fibrous or particulate fillers or mixtures thereof, processing assistants, for example lubricants, mold release agents, stabilizers, such as UV stabilizers and phosphorus stabilizers, antioxidants, antistatic agents and colorants.

Fillers are present in the novel molding materials in general in amounts of from 0 to 40, preferably from 0 to 30, % by weight, based on the sum of the components A to G. Processing assistants are usually used in amounts of from 0 to 5, preferably from 0 to 3, % by weight, based on the sum of the components A to G. The amount of stabilizers and antistatic agents the novel molding materials is as a rule from 0 to 3, preferably from 0 to 2, % by weight, based on the sum of the components A to G. Colorants may be used, for example, in amounts of from 0 to 10, preferably from 0 to 8, % by weight, based on the sum of the components A to G.

The preferred fillers include carbon fibers and in particular glass fibers. The glass fibers used may comprise E, A or C glass and are preferably provided with a size and an adhesion promoter. Their diameter is in general from 6 to 20 am. Both rovings and cutglass fibers having a length of from 1 to 10 mm, preferably from 3 to 6 mm, may be used.

Fillers or reinforcing materials, such as glass beads, mineral fibers, whiskers, alumina fibers, mica, quartz powder and wollastonite, may also be added.

Metal flakes (eg. aluminum flakes from Transmet Corp.), metal powders, metal fibers, metal-coated fillers (eg. nickel-coated glass fibers) and other additives which provide shielding against electromagnetic waves may also be mentioned. Aluminum flakes (K 102 from Transmet) for EMI (electro-magnetic interference) purposes are particularly suitable, as well as mixtures of this material with additional carbon fibers, conductive carbon black or nickel-coated carbon fibers.

Processing assistants are generally known. For example, fatty 30 acid-based multicomponent esters or ethylene waxes may be used as lubricants.

Particularly suitable UV stabilizers are phosphites, hypophosphites or phosphonites, as well as benzotriazoles or benzophenones. Particularly preferred stabilizers are mixtures of a phosphine of the general formula VII $PR^7R^8R^9$      VII where R⁷, R⁸ and R⁹, independently of one another, are each alkyl, cycloalkyl, aryl or arylalkyl, or an aryl group which is substituted on the aromatic ring by one or more halogen atoms or one or more alkyl or alkoxy groups, and a hindered phenol.

The particularly preferred phosphines include triethylphosphine, tributylphosphine, tripropylphosphine, triamylphosphine, trioctylphosphine, dimethylphenylphosphine, dibutylphenylphosphine, diphenylmethylphosphine, diphenylbutylphosphine, diphenyloctylphosphine, diphenyloctadecylphosphine, triphenylphosphine, tri(butylphenyl)phosphine, tri-p-tolylphosphine, tri(p-nonylphenyl)phosphine, trinaphthylphosphine, tri(p-chlorophenyl)phosphine, tri(p-fluorophenyl)phosphine, diphenylbenzylphosphine, diphenyl(p-hydroxyphenyl)phosphine, di-phenyl-1,4-dihydroxyphenyl-2-phosphine and phenylnaphthylbenzylphosphine. Triphenylphosphine is the particularly preferred compound of the formula VII.

Particularly suitable hindered phenols are 2,6-di-tert-butyl-4-methylphenol, 2,6-di-tert-butyl-4-sec-butylphenol, 4-(hydroxymethyl)-2,6-di-tert-butylphenol and 2,6-di-tert-butyl-4-methoxyphenol. Further examples of preferred phenols are octadecyl 3,5-di-tert-butyl-4-hydroxyhydrocinnamate, 2-methyl-4,6-bis((octylthio)methyl)phenol, 2,6-di-tert-butyl-4-(dimethylaminomethyl)phenol and 3,5-di-tert-butyl-4-hydroxybenzyl di-O-ethyl phosphonate. Dinuclear hindered phenols may also be used. Such stabilizer mixtures are disclosed, for example, in DE-A 44 19 897.

The colorants used may be both organic and inorganic pigments. A list of suitable colorants appears, for example, in Gächter/Müller, "Kunststoff-Additive", 3rd Edition, Hanser Verlag Munich, 1989.

In addition to the stated components, the novel molding materials may also contain small amounts of homo- or copolymers which may form as byproducts in the grafting of the networks $d_1$. These homo- or copolymers each have the composition and glass transition temperature of the graft layer $d_2$. Their weight average molecular weights ($M_w$) are below 400 000, in general less than 200 000, g/mol. As a rule, these byproducts are present in amounts of not more than 10% by weight, based on the sum of the components A to G.

The novel molding materials are prepared by mixing the components by methods known per se. It may be advantageous to premix individual components. It is also possible to mix the components in solution and remove the solvents.

Suitable organic solvents for the components A to F and the additives of group G are, for example, chlorobenzene, mixtures of chlorobenzene and methylene chloride or mixtures of chlorobenzene and aromatic hydrocarbons, eg. toluene.

Mixing of the components A, B, C, D, E and, if required, F and G, for example in the dry state, can be carried out by all known methods. Preferably, however, the components A, B, C, D, E and, if required, F and G are mixed at from 200 to 320° C. by extruding, kneading or roll-milling the components together, if necessary the components having been isolated beforehand from the solution obtained in the polymerization or from the aqueous dispersion.

The novel molding materials may be processed by the known methods for processing thermoplastics, for example by extrusion, injection molding, calendering, blow molding, compression molding or sintering.

The novel molding materials are thermoplastic and resistant to weathering and to aging and have very good low-temperature toughness and good heat distortion resistance. Moreover, they have excellent flowability and very good impact strength. In particular, they have total penetration energies which are substantially independent of the processing conditions, ie. melt temperatures, of the molding materials.

The novel molding materials are therefore particularly suitable for the production of moldings, especially of large moldings. The novel molding materials are particularly suitable for the production of moldings for exterior applications. These include, for example, automotive parts, in particular bodywork parts for use in cars. However, it is also possible to produce films or fibers from the novel molding materials.

EXAMPLES

The average particle size and the particle size distribution were determined from the integral mass distribution. The average particle sizes are in all cases the weight average of the particle sizes as determined by means of an analytical ultracentrifuge by the method of W. Scholtan and H. Lange, Kolloid-Z. and Z.-Polymere 250 (1972), 782–796. The ultracentrifuge measurement gives the integral mass distribution of the particle diameter of a sample. From this it is possible to determine the percentage by weight of the particles which have a diameter equal to or less than a certain size. The median particle diameter, which is also referred to as the $d_{50}$ value of the integral mass distribution, is defined as the particle diameter at which 50% by weight of the particles have a smaller diameter than the diameter which corresponds to the $d_{50}$ value. Likewise, 50% by weight of the particles then have a larger diameter than the $d_{50}$ value. In addition to the $d_{50}$ value (median particle diameter), the $d_{10}$ and $d_{90}$ values obtained from the integral mass distribution are used for characterizing the width of the particle size distribution of the rubber particles. The $d_{10}$ and $d_{90}$ values of the integral mass distribution are accordingly defined similarly to the $d_{50}$ value, except that they are based on 10 and 90% by weight, respectively, of the particles. The quotient $Q=(d_{90}-d_{10})/d_{50}$ is a measure of the width of the particle size distribution.

The following components were used:

A$^1$) A commercial polycarbonate based on bisphenol A and having a viscosity number of 61.3 ml/g, measured in a 0.5% strength by weight solution in methylene chloride at 23° C.

B$^1$) A finely divided graft polymer prepared from

β$_1$) 16 g of butyl acrylate and 0.4 g of tricyclodecenyl acrylate in 150 g of water, which were heated to 60° C. while stirring, with the addition of 1 g of the sodium salt of a $C_{12}$-$C_{18}$-paraffinsulfonic acid, 0.3 g of potassium persulfate, 0.3 g of sodium bicarbonate and 0.15 g of sodium pyrophosphate. 10 Minutes after the initiation of the polymerization reaction, a mixture of 82 g of butyl acrylate and 1.6 g of tricyclodecenyl acrylate was added in the course of 3 hours. After the end of the monomer addition, stirring was continued for a further hour. The resulting latex of the crosslinked butyl acrylate polymer had a solids content of 40% by weight, the weight average particle size was determined as 76 nm and the particle size distribution was narrow (quotient Q=0.29).

β$_2$) 150 g of the polybutyl acrylate latex obtained according to β$_1$) were mixed with 40 g of a mixture of styrene and acrylonitrile (weight ratio 75:25) and 60 g of water and, after the addition of a further 0.03 g of potassium persulfate and 0.05 g of lauroyl peroxide, were heated at 65° C. for 4 hours while stirring. After the end of the graft copolymerization, the polymerization product was precipitated from the dispersion by means of calcium chloride solution at 95° C., washed with water and dried in a warm air stream. The degree of grafting of the graft copolymer was 35% and the particle size was 91 nm.

B$^2$) A coarse-particled graft polymer which was prepared as follows:

β$_3$) 50 g of water and 0.1 g of potassium persulfate were added to an initially taken mixture of 1.5 g of the latex prepared according to β$_1$) after which a mixture of 49 g of butyl acrylate and 1 g of tricyclodecenyl acrylate on the one hand and a solution of 0.5 g of the sodium salt of a $C_{12}$-$C_{18}$-paraffinsulfonic acid in 25 g of water on the other hand were added in the course of 3 hours at 60° C. Polymerization was then continued for 2 hours. The resulting latex of the crosslinked butyl acrylate polymer had a solids content of 40%. The average particle size (weight average of the latex) was determined as 430 nm and the particle size distribution was narrow (Q=0.1).

β$_4$) 150 g of the latex prepared according to β$_3$) were mixed with 20 g of styrene and 60 g of water and, after the addition of a further 0.03 g of potassium persulfate and 0.05 g of lauroyl peroxide, were heated at 65° C. for 3 hours while stirring. The dispersion obtained in this graft copolymerization was then polymerized with 20 g of a mixture of styrene and acrylonitrile in a weight ratio of 75:25 for a further 4 hours. The reaction product was then precipitated from the dispersion by means of a calcium chloride solution at 95° C., isolated, washed with water and dried in a warm air stream. The degree of grafting of the graft copolymer was determined as 35%; the average particle size of the latex particles was 510 nm.

C$^1$) A copolymer of styrene and acrylonitrile in a weight ratio of 80:20, having a viscosity number of 83 ml/g (measured in a 0.5% strength by weight solution in dimethylformamide at 23° C.), prepared by continuous solution polymerization by a method as described, for example, in Kunststoff-Handbuch, Vieweg-Daumiller, Volume V (Polystyrol), Carl-Hanser-Verlag, Munich 1969, page 124, line 12 et seq.

D$^1$) A network rubber (for example Metablen® S2001 from Elf Atochem) comprising a crosslinked dimethylsiloxane having a glass transition temperature $T_g$ of −128° C. (8.3% by weight, based on the total network rubber), an n-butyl acrylate rubber having a $T_g$ of −45° C. and a graft layer essentially comprising methyl methacrylate and having a $T_g$ of 90° C. The glass transition temperatures were determined in each case by means of a torsion pendulum at a frequency of 1 Hz and a heating rate of 10° C/min.

E[1]) A copolymer of 99% by weight of methyl methacrylate and 1% by weight of n-butyl acrylate, characterized by a weight average molecular weight ($M_w$) of 1,800,000 g/mol (determined by means of gel permeation chromatography in tetrahydrofuran against polystyrene standard).

E[2]) A copolymer of 99% by weight of methyl methacrylate and 1% by weight of n-butyl acrylate.

The $T_g$ values for the copolymers E were each determined by DSC measurements (heating rate 10 K/min, second cycle after heating up to 175° C. and cooling to room temperature).

F[1]) Resorcinol diphenyl phosphate, eg. Fyroflex® from Akzo

G[1]) A high molecular weight fatty acid-based multicomponent ester (eg. Loxiol® G70S from Henkel), characterized by a melt viscosity from 110 to 150 mPas at 80° C.

G[2]) Polytetrafluoroethylene dispersion, eg. Teflon® Dispersion 30 N from DuPont.

Preparation of the molding materials

The components stated in the table were mixed in a twin-screw extruder (ZKS 30 from Werner und Pfleiderer) at from 250 to 280° C., the mixture was extruded and the extrudate was cooled and granulated. The dried granules were processed at from 250 to 280° C. to give standard small bars or ISO test specimens. Circular disks were produced at melt temperatures of 240, 260, 280 and 300° C. and a mold temperature of 80° C.

Testing of performance characteristics

The heat distortion resistance of the samples was determined by means of the Vicat softening temperature. The Vicat softening temperature was determined according to DIN 53 460, using a force of 49.05 N and a temperature increase of 50 K per hour, on standard small bars.

The flowability (MVI) of the molding materials was determined according to DIN 53 735 at 260° C. and 5 kg load.

The notched impact strength was determined according to ISO 179 leA at -30° C.

The total penetration energies $W_s$ [Nm] (mean value of five individual measurements) were measured by means of the penetration tests according to DIN 53 443 at −30° C. The fracture behavior was also assessed qualitatively for the penetrated test specimens, a distinction being made between brittle fracture (B) and ductile fracture (D). The numerical values indicate the number of circular disks suffering ductile fracture.

The flame retardancy was tested in the vertical fire test according to the specifications of Underwriters Laboratories (Ul 94). The test was carried out on, in each case, 5 samples measuring 127 mm×12.7 mmm×1.7 mm.

Classification in the appropriate fire classes was carried out according to UL-94 on the basis of the following criteria

| Fire class | Combustion time | Total combustion time | Dripping of flaming particles |
|---|---|---|---|
| V-0 | ≦10 | ≦50 | no |
| V-1 | ≦30 | ≦250 | no |
| V-2 | ≦30 | ≦250 | yes with ignition of the cotton wool |
| V-- | no allocation to the above classes possible | | |

The compositions and the properties of the molding materials are shown in Table 1.

TABLE 1

| Molding material No. | V1* | V2 | 1 | 2 | V3 | 3 | V4 | 4 | 5 |
|---|---|---|---|---|---|---|---|---|---|
| Component [% by weight] | | | | | | | | | |
| A[1] | 60 | 60 | 59.4 | 58.8 | 58.8 | 58.8 | 67.5 | 67.5 | 67.5 |
| B[1] | 20 | 5 | 4.95 | 4.9 | 4.9 | 4.9 | 7 | 5 | 5 |
| B[2] | — | 5 | 4.95 | 4.9 | 4.9 | 4.9 | 7 | 5 | 5 |
| C[1] | 20 | 20 | 19.8 | 19.6 | 19.6 | 19.6 | 7 | 5 | 5 |
| D[1] | — | 10 | 9.9 | 9.8 | 9.8 | 9.8 | — | 4 | 4 |
| E[1] | — | — | 1 | 2 | — | 2 | — | 2 | 2 |
| E[2] | — | — | — | — | 2 | — | — | — | — |
| F[1] | — | — | — | — | — | — | 11 | 11 | 11 |
| G[1] | — | — | — | — | — | 0,5 | — | — | — |
| G[2] | — | — | — | — | — | — | 0,5 | 0,5 | 0,5 |
| Properties: | | | | | | | | | |
| Vicat B [° C.] | 120 | 121 | 121 | 120 | 118 | 120 | 100 | 101 | 101 |
| $a_K$ -30° C. [kJ/m²] | 6 | 14 | 14 | 14 | 7 | 13 | 3.7 | 9 | 11 |
| $W_s$ -30° C. [Nm]/240/80 | 14 | 40 | 40 | 42 | 21 | 41 | 21 | 36 | 41 |
| Fracture pattern | 1D | 5D | 5D | 5D | 2D | 5D | 1D | 3D | 4D |
| $W_s$ -30° C. [Nm]/260/80 | 33 | 51 | 47 | 41 | 37 | 43 | 32 | 39 | 47 |
| Fracture pattern | 3D | 5D | 5D | 5D | 4D | 5D | 2D | 3D | 5D |

TABLE 1-continued

| Molding material No. | V1* | V2 | 1 | 2 | V3 | 3 | V4 | 4 | 5 |
|---|---|---|---|---|---|---|---|---|---|
| $W_s$ −30° C. [Nm]/280/80 | 10 | 50 | 42 | 47 | 45 | 46 | 22 | 29 | 41 |
| Fracture pattern | 0D | 5D | 5D | 5D | 5D | 5D | 1D | 3D | 5D |
| $W_s$ −30° C. [Nm]/300/80 | 51 | 11 | 20 | 46 | 34 | 45 | | | |
| Fracture pattern | 5D | 1D | 3D | 5D | 4D | 5D | | | |
| MVI [ml/10 min] | 12 | 13 | 14 | 13 | 12 | 15 | 42 | 39 | 38 |
| UL-94 | V-- | V-- | V-- | V-- | V-- | V-- | V-O | V-O | V-O |

*V: Comparative Experiment

The novel thermoplastic molding materials have ductile fracture behavior at −30° C., no dependence on the melt temperature being observed. Furthermore, the novel molding materials have very good toughness and good flowability.

What is claimed is:

1. A molding material containing, as essential components,
   A) from 25 to 95.4% by weight of at least one aromatic polycarbonate
   B) from 2 to 3 0% by weight of at least one graft polymer composed of
      $b_1$) from 40 to 80% by weight of a grafting base comprising an elastomeric polymer based on alkyl acrylates where the alkyl radical is of from 1 to 8 carbon atoms and having a glass transition temperature of less than 10° C.
      $b_2$) from 2 0 to 60% by weight of a graft layer comprising
         $b_{21}$) from 60 to 95% by weight of styrene or substituted styrenes of the general formula I

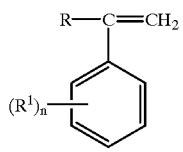

where R is alkyl of 1 to 8 carbon atoms or hydrogen, $R^1$ is alkyl of 1 to 8 carbon atoms and n is 1, 2 or 3, and
      $b_{22}$) from 5 to 40% by weight of at least one unsaturated nitrile,
   C) from 2 to 50% by weight of a copolymer of
      $c_1$) from 60 to 95% by weight of styrene or substituted styrenes of the general formula I or mixtures thereof
      $c_2$) from 5 to 40% by weight of at least one unsaturated nitrile,
   D) from 0.5 to 25% by weight of at least of at least one network rubber based on organopolysiloxanes and polymers of acrylates and/or methacrylate.
   E) from 0.1 to 5% by weight of at least one copolymer, which has an average molecular weight($M_w$) of at least 1,000,000 g/mol, of at least two different esters of acrylic acid or of methacrylic acid or mixtures thereof,
   F) from 0 to 25% by weight of at least one halogen-free phosphorus compound and
   G) from 0 to 45% by weight of additives, the sum of components A to G being 100% by weight.

2. A molding material as claimed in claim 1, containing, as essential components,
   A) from 25 to 88.8% by weight of at least one polycarbonate A,
   B) from 5 to 25% by weight of at least one graft polymer B,
   C) from 5 to 40% by weight of at least one copolymer C,
   D) from 1 to 15% by weight of at least one network rubber D and
   E) from 0.2 to 3% by weight of at least one copolymer E.

3. A molding material as claimed in claim 1, in which said network rubber D is a core/shell graft copolymer in which the graft shell comprises from 95 to 100% by weight of methyl methacrylate.

4. A molding material as claimed in claim 3, containing as essential components,
   A) from 25 to 88.8% by weight of at least one polycarbonate A,
   B) from 5 to 25% by weight of at least one graft polymer B,
   C) from 5 to 40% by weight of at least one copolymer C,
   D) from 1 to 15% by weight of at least one network rubber D, and
   E) from 0.2 to 3% by weight of at least one copolymer E, where E is composed of methyl methacrylate and n-butyl acrylate or methyl methacrylate and 2-ethylhexyl acrylate.

5. A molding material as claimed in claim 1, in which the copolymer E is composed of methyl methacrylate and n-butyl acrylate or methyl methacrylate and 2-ethylhexyl acrylate.

6. A molding, film or fiber obtained from a molding material as claimed in claim 1.

7. A bodywork part obtained from a molding material as claimed in claim 1.

8. A bodywork part comprising a molding material as claimed in claim 1.

9. A bodywork part obtained from a molding material as claimed in claim 3.

10. A body part comprising a molding material as claimed in claim 3.

11. A molding, film or fiber obtained from a molding material as claimed in claim 3.

12. A bodywork part obtained from a molding material as claimed in claim 4.

13. A bodywork part comprising a molding material as claimed in claim 4.

14. A molding, film or fiber obtained from a molding material as claimed in claim 4.

* * * * *

UNITED STATES PATENT AND TRADEMARK OFFICE
CERTIFICATE OF CORRECTION

PATENT NO. : 6,232,397 B1
DATED : May 15, 2001
INVENTOR(S) : Weber et al.

It is certified that error appears in the above-identified patent and that said Letters Patent is hereby corrected as shown below:

<u>Column 15, claim 1,</u>
Line 23, "2 to 3 0%" should be -- 2 to 30% --.
Line 30, from "2 0 to 60%" should be -- 20 to 60% --.
Line 53, "of at least of at least" should be -- of at least --.

Signed and Sealed this

Thirtieth Day of October, 2001

Attest:

NICHOLAS P. GODICI
Attesting Officer    Acting Director of the United States Patent and Trademark Office